April 17, 1951     P. H. HARRER     2,549,086
MEANS OF FASTENING CRANK TO REEL TOOTH BAR TUBE
Filed Oct. 19, 1949
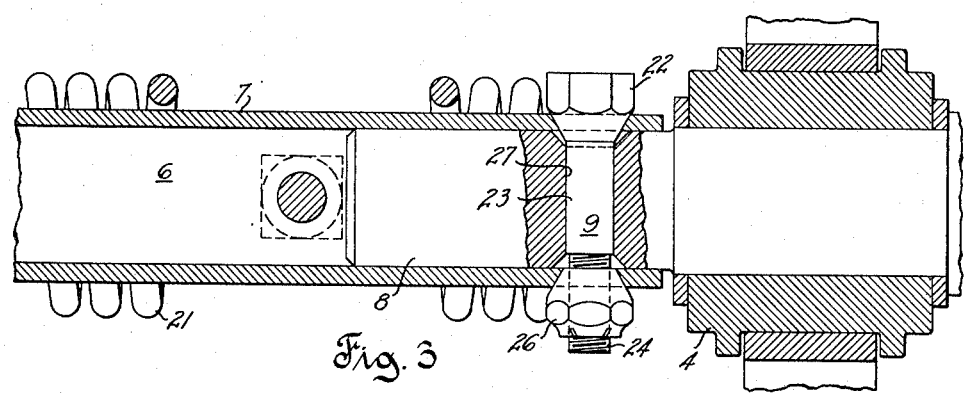
Fig. 3
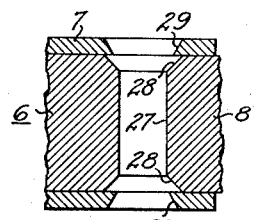
Fig. 4
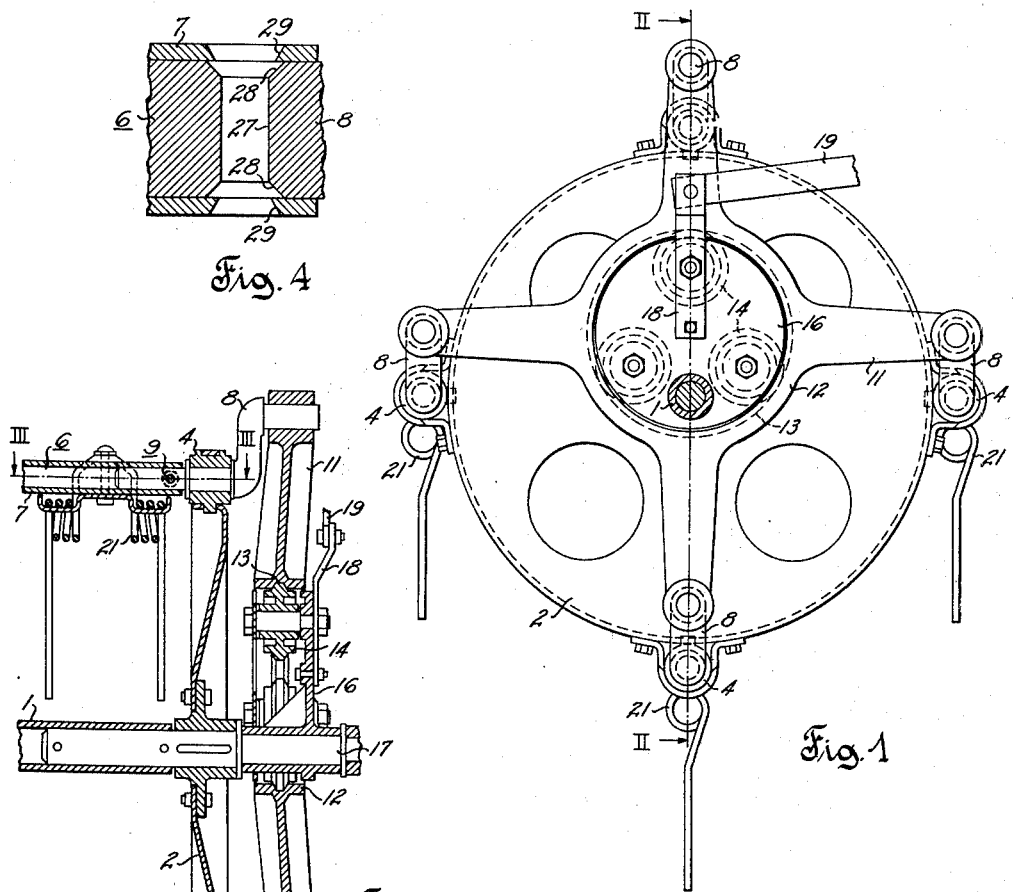
Fig. 1
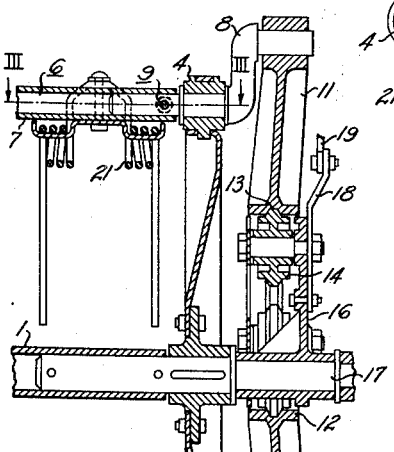
Fig. 2
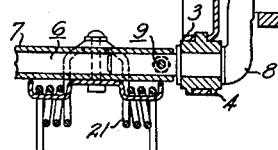
Inventor
Paul H. Harrer
by Kenneth Mackin
Attorney Patented Apr. 17, 1951

2,549,086

UNITED STATES PATENT OFFICE 2,549,086

MEANS OF FASTENING CRANK TO REEL TOOTH BAR TUBE

Paul H. Harrer, La Porte, Ind., assignor to Allis-Chalmers Manufacturing Company, Milwaukee, Wis., a corporation of Delaware Application October 19, 1949, Serial No. 122,311

6 Claims. (Cl. 287—119)

This invention relates generally to agricultural implements incorporating elongated parts designed to be detachably end connected in fixed axial, angular relation with respect to each other, and is more particularly concerned with and has as an object the provision of a readily separable tube and crank assembly affording material advantages as to the durability of the connection therebetween, as to ease of assembly and separability, and as to initial cost.

In rakes of the type incorporating a rotating reel comprising circumferentially spaced thin walled time carrying tubes journaled in bearing structures secured to peripheral portions of longitudinally spaced, coaxial disks and a crank extension element secured to the end of each tine tube with the outer ends of the cranks journaled in peripheral portions of a rotatable spider member eccentrically adjustable relative to the axis of the reel to thereby vary the angular position of the tine tubes, considerable difficulty has been experienced in maintaining the connected tube and crank element in a fixed angular relation. For example, a means commonly employed to achieve this end, a bolt inserted through aligned holes in the telescoped end portions of the tube and crank element, invariably results in a circumferential elongation of the holes in the thin walled tube and a consequent relative angular movement of the tube and crank element. This relative angular movement may occur initially or after a short period of operation since it is practically impossible to obtain a manufacturing drive fit for the bolt and the extent of such movement invariably becomes greater as the time of operation increases. Consequently, angular adjustment of the tubes and the tines carried thereby soon becomes impractical thus necessitating costly and time consuming repairs in order to render the spider structure operative for the purpose intended and the rake effective under varying field conditions.

And while it is realized that the above mentioned defect may be overcome through the use of any one of a number of known expedients, these known expedients all incorporate a construction which is entirely too heavy and/or far more costly than is considered practical for use in apparatus of the type with which this invention is primarily concerned. Consequently, the present invention is more specifically directed toward and has as a further object the provision of a rake tine tube and crank assembly incorporating features of improvement effectively eliminating a circumferential elongation of the bolt receiving holes in a thin walled tube alignable with a complementary hole through the portion of a crank element telescoped within an end portion of the tine tube.

Accordingly, this invention may be considered as comprising the various features of construction and/or combination more fully set forth in the following detailed description and appended claims. And attention is specifically directed to the detailed description and drawing for a complete understanding of the construction and operation of a practical embodiment of the present invention designed to accomplish the aforementioned and other objects and to afford numerous advantages as hereinafter particularly set forth.

Referring to the drawing:

Fig. 1 is a partial end view of a rake reel structure embodying the invention;

Fig. 2 is a section taken on line II—II of Fig. 1;

Fig. 3 is an enlarged detail, partly in section on line III—III of Fig. 2, of the connection between the tube and crank elements; and Fig. 4 is a view similar to Fig. 3 with the fastening element removed.

Considering Figs. 1 and 2, it will be observed that the invention is shown as applied, by way of illustration, to the right hand or power input end of the rotary reel structure of a tractor propelled and operated rake such as is disclosed and claimed in U. S. patent, R. C. Fergason, 2,476,183, Side Delivery Rake, granted July 12, 1949, and that the reel supporting frame and drive mechanism have been omitted in the interest of clarity. In the drawing it will be observed that the reel comprises a central fabricated shaft 1 fixedly mounting a disk 2 presenting a coaxially extending peripheral flange 3 detachably supporting circumferentially spaced bearing structures 4 in which are journaled the adjacent ends of fabricated tine carrying bars 6. Each tine bar comprises a thin walled tubular section 7, parallel to central shaft 1, and a crank extension 8 having one end portion telescoped within and detachably connected to the adjacent end of tubular section 7 by means of a fastening element or bolt 9, a part of this same end portion of the crank extension being rotatably journaled in bearing structure 4.

The opposite offset end portion of each crank extension 8 is rotatably journaled in an opposed peripheral portion of a control spider 11 having an annular hub part 12 provided with a circumferentially grooved inner surface 13 coaxial with respect to the offset ends of crank extension 8. Spider 11 is rotatably supported on a coaxial group of ribbed rollers 14 detachably mounted on a member 16 which is in turn eccentrically mounted on a reduced portion 17 of shaft 1 adjacent the outer side of reel disk 2 for turning movement relative thereto. The ribbed peripheries of rollers 14 are complementary to and supportingly engage the inner grooved surface 13 on spider hub part 12 thereby retaining the spider, rollers and roller carrying member in correct operative relationship. Member 16 may be turned to and retained in any selected one of a plurality of positions by means of an arm 18 thereon connected with a control rod 19 for actuation by an operator and retention in the position selected through any suitable means, such as a conventional releasable latch means (not shown). Movement of member 16 varies the position of spider 11 with respect to reel disk 2 and thereby the angular position of tine bars 6 and the tines mounted thereon, the tine bars responding to a movement of member 16 by turning in their bearing structures 4 detachably secured to disk 2.

The rake teeth are formed by a plurality of spring tine elements 21 which are preferably constructed and detachably mounted on tine bars 6 in a manner generally similar to that disclosed and claimed in U. S. Patent, Merle W. Bloom, 2,432,653, for Spring Tine Mounting, to which reference may be had for more complete details as to this feature. And in this connection, it is believed that the construction and operation of the parts as thus far described should suffice for a complete understanding of the present invention. Therefore, a more detailed disclosure has been omitted in the interest of simplicity, it being understood however that the actual construction and operation of the parts hereinbefore described are identical to those disclosed in the previously identified Fergason patent to which reference may be had if any additional information is desired.

Referring particularly to Fig. 3, it will be seen that fastening element 9 comprises a bolt having an inwardly tapered head portion 22, a shank portion 23 terminating in a threaded end portion 24 of reduced diameter, and a nut 26 inwardly tapered in a manner and to an extent generally similar to head portion 22. The portion of crank extension 8 telescoped within the adjacent end of tube section 7 is provided with a diametral bore or hole 27 therethrough terminating in outwardly flaring opposite end portions 28, and the opposite sides of tube section 7 are provided with outwardly flaring holes 29 (note Fig. 4) alignable with the opposite ends of the bore 27 in the crank extension. And in this connection it should be noted that the degree of outward flare of the opposite end portions 28 of bore 27 is somewhat greater than the outward flare of the associated holes in tube section 7. Also, it should be noted that the degree of inward taper of the bolt head and nut portions 22 and 26 are respectively complementary to the outward flare of the associated hole 29 in tube section 7. Consequently, it will be apparent that this difference in the degree of outward flare with respect to bore portions 28 and holes 29 insures a substantially perfect fit between the latter and the inwardly tapered bolt portions 22 and 26 irrespective of the usual variations in manufacturing tolerances, this fit being readily obtained in assembly simply by tightening nut portion 26.

In view of the foregoing it should now be obvious that if bolt nut portion 26 is properly tightened and secured there can be no initial movement or play between tube section 7 and fastening element 9 and that this result is readily achieved, with a consequent elimination of the aforementioned difficulties, through the use of a simple, durable and inexpensive construction. And while the construction disclosed by way of example illustrates the use of flared and tapered annular surfaces, it is to be understood that the extent of flare and taper may be varied both longitudinally and annularly relative to the axis of the bore and holes so long as the tightening of the nut or other functionally comparable portion of the fastening element achieves the result desired, and that therefore it is not intended to limit the invention to exact details shown and described as various modifications within the scope of the appended claims may occur to persons skilled in the art.

It is claimed and desired to secure by Letters Patent:

1. In an agricultural implement incorporating a rotatably supported member having a thin walled tubular element mounted for rotation relative to said member and having a crank element with one end portion thereof telescoped within the adjacent end portion of said tubular element and with its other end portion journaled on a rotatable part eccentrically supported for rotational adjustment relative to said member, an improved detachable connection between said crank and tube elements comprising a bore extending straight through said one end portion of said crank element with at least one end of said bore terminating in an outwardly flaring portion, a pair of holes extending through opposite sides of said adjacent end portion of said tube in aligned relation with respect to the opposite ends of said bore with the one of said holes associated with the outwardly flaring end portion of said bore also flaring outwardly, and a fastening element inserted through said aligned bore and holes and presenting an enlarged inwardly tapered end portion extending within said outwardly flaring hole in said tube element.

2. In an agricultural implement incorporating a rotatably supported member having a thin walled tubular element mounted for rotation relative to said member and having a crank element with one end portion thereof telescoped within the adjacent end portion of said tubular element and with its other end portion journaled on a rotatable part eccentrically supported for rotational adjustment relative to said member, an improved detachable connection between said crank and tube elements comprising a bore extending straight through said one end portion of said crank element with at least one end of said bore terminating in an outwardly flaring portion, a pair of holes extending through opposite sides of said adjacent end portion of said tube in aligned relation with respect to the opposite ends of said bore with the one of said holes associated with the outwardly flaring end portion of said bore also flaring outwardly, and a fastening element inserted through said aligned bore and holes and presenting an enlarged inwardly tapered end portion extending within said outwardly flaring hole in said tube element, said enlarged portion of said fastening element tapering longitudinally thereof a distance greater than the radial wall thickness of said tube element.

3. In an agricultural implement incorporating a rotatably supported member having a thin walled tubular element mounted for rotation relative to said member and having a crank element with one end portion thereof telescoped within the adjacent end portion of said tubular element and with its other end portion journaled on a rotatable part eccentrically supported for rotational adjustment relative to said member, an improved detachable connection between said crank and tube elements comprising a bore extending straight through said one end portion of said crank element with at least one end of said bore terminating in an outwardly flaring portion, a pair of holes extending through opposite sides of said adjacent end portion of said tube in aligned relation with respect to the opposite ends of said bore with the one of said holes associated with the outwardly flaring end portion of said bore also flaring outwardly but to a lesser degree than the outwardly flaring portion of said bore, and a fastening element inserted through said aligned bore and holes and presenting an enlarged inwardly tapered end portion extending within said outwardly flaring hole in said tube element, said enlarged portion of said fastening element tapering longitudinally thereof a distance greater than the radial wall thickness of said tube element.

4. In a rake structure incorporating a rotatably supported reel having a thin walled tubular tine carrying bar mounted for rotation relative to said reel and having a crank element with one end portion thereof telescoped within the adjacent end portion of said tubular bar and with its other end portion journaled on a spider member eccentrically supported for rotational adjustment relative to said reel, an improved detachable connection between said crank element and tubular bar comprising a bore extending straight through said one end portion of said crank element and presenting outwardly flared opposite end portions, a pair of outwardly flaring holes extending through said adjacent end portion of said tubular bar in alignment with respect to the opposite ends of said bore, and a fastening element inserted through said aligned bore and holes and having enlarged opposite end portions tapering inwardly in complementary relation to said outwardly flaring holes in said tubular bar.

5. In a rake structure incorporating a rotatably supported reel having a thin walled tubular tine carrying bar mounted for rotation relative to said reel and having a crank element with one end portion thereof telescoped within the adjacent end portion of said tubular bar and with its other end portion journaled on a spider member eccentrically supported for rotational adjustment relative to said reel, an improved detachable connection between said crank element and tubular bar comprising a bore extending straight through said one end portion of said crank element and presenting outwardly flared opposite end portions, a pair of outwardly flaring holes extending through said adjacent end portion of said tubular bar in alignment with respect to the opposite ends of said bore, and a fastening element inserted through said aligned bore and holes and having enlarged opposite end portions tapering inwardly in complementary relation to said outwardly flaring holes in said tubular bar, said enlarged opposite end portions of said fastening element each being tapered inward for a distance in excess of the radial wall thickness of said tubular bar.

6. In a rake structure incorporating a rotatably supported reel having a thin walled tubular tine carrying bar mounted for rotation relative to said reel and having a crank element with one end portion thereof telescoped within the adjacent end portion of said tubular bar and with its other end portion journaled on a spider member eccentrically supported for rotational adjustment relative to said reel, an improved detachable connection between said crank element and tubular bar comprising a bore extending straight through said one end portion of said crank element and presenting outwardly flared opposite end portions, a pair of outwardly flaring holes extending through said adjacent end portion of said tubular bar in alignment with respect to the opposite ends of said bore, said holes having a degree of outward flare somewhat less than the outward flare of the associated ends of said bore, and a fastening element inserted through said aligned bore and holes and having enlarged opposite end portions tapering inwardly in complementary relation to said outwardly flaring holes in said tubular bar, said enlarged opposite end portions of said fastening element each being tapered inward for a distance in excess of the radial wall thickness of said tubular bar.

PAUL H. HARRER.

No references cited.